United States Patent
Bullen et al.

(10) Patent No.: US 8,140,454 B2
(45) Date of Patent: Mar. 20, 2012

(54) SYSTEMS AND/OR METHODS FOR PREDICTION AND/OR ROOT CAUSE ANALYSIS OF EVENTS BASED ON BUSINESS ACTIVITY MONITORING RELATED DATA

(75) Inventors: Geoff Bullen, Broomfield, CO (US); Richard M. Dickson, Broomfield, CO (US); Warren C. Roberts, Arvada, CO (US)

(73) Assignee: Software AG, Darmstadt (DE)

( * ) Notice: Subject to any disclaimer, the term of this patent is extended or adjusted under 35 U.S.C. 154(b) by 1116 days.

(21) Appl. No.: 12/003,640

(22) Filed: Dec. 28, 2007

(65) Prior Publication Data

US 2009/0171879 A1    Jul. 2, 2009

(51) Int. Cl.
  *G06E 1/00* (2006.01)
  *G06F 15/18* (2006.01)
(52) U.S. Cl. ............... 706/21; 706/14; 706/10
(58) Field of Classification Search .............. None
See application file for complete search history.

(56) References Cited

U.S. PATENT DOCUMENTS

| | | | |
|---|---|---|---|
| 5,210,704 A * | 5/1993 | Husseiny | 702/34 |
| 6,665,425 B1 * | 12/2003 | Sampath et al. | 382/112 |
| 7,107,339 B1 | 9/2006 | Wolters | |
| 8,001,527 B1 * | 8/2011 | Qureshi et al. | 717/120 |
| 2002/0116248 A1 | 8/2002 | Amit et al. | |
| 2002/0133757 A1 * | 9/2002 | Bertram et al. | 714/47 |
| 2003/0097457 A1 | 5/2003 | Saran et al. | |
| 2005/0096873 A1 * | 5/2005 | Klein | 702/184 |

FOREIGN PATENT DOCUMENTS

EP    1 528 710    5/2005

OTHER PUBLICATIONS

Dey et al., S., "A Bayesian Network Approach to Root Cause Diagnosis of Process Variations", International Journal of Machine Tools & Manufacture 45, p. 75-91, 2005.*
Lee et al., B., "Using Bayes Belief Networks in Industrial FMEA Modeling and Analysis", IEEE Proceedings of Annual Reliability and Maintainability Symposium, p. 7-15, 2001.*
Chai et al., S., "Power Disturbance Identification Through Pattern Recognition System", IEEE, p. 154-157, 2000.*
"Java Message Service API Tutorial", Kim Haase, Sun Microsystems, Inc., Aug. 2001, pp. 1-278.
"Guarantee Inter-Enterprise Message Delivery Using JMS", Gopalan Suresh Raj, Java Report, SIGS Publications, New York, vol. 5, No. 8, Aug. 2000.

(Continued)

*Primary Examiner* — Jeffrey A Gaffin
*Assistant Examiner* — Adrian Kennedy
(74) *Attorney, Agent, or Firm* — Nixon & Vanderhye PC

(57) ABSTRACT

In certain example embodiments of this invention, there is provided systems and/or methods for processing BAM-related data to predict when events of interest are about to happen and/or to identify the root causes of, or at least data correlated with, such events of interest. In certain example embodiments, key performance indicators (KPIs) are gathered and gardened. The gardening process may identify KPI values of interest (e.g., based on a Z-factor analysis thereof across one or more collection intervals). The gardened KPIs may be processed using a time-series transform (e.g., a Fast Fourier Transform), matched to one of a plurality of predefined waveforms, and fed into a dynamic Naïve Bayesian Network (NBN) for prediction. The gardened data also may be used to determine the relevance of the KPI for root causes of problems (e.g., based on a chi-square analysis).

20 Claims, 15 Drawing Sheets

OTHER PUBLICATIONS

"JMS and CORBA Notification Interworking", Steve Trythall, Internet Citation, Dec. 12, 2001.
"Naive Bayes Classifier", Electronic Textbook StatSoft, 1984-2006, pp. 1-4.
"Naive Bayes Models for Probability Estimation", Lowd, Daniel and Domingos, Pedro, Proceedings of the 22nd International Conference on Machine Learning, Bonn, Germany, 2005.
"Automatic Feature Extraction for Classifying Audio Data", Mierswa, Ingo and Morik, Katharina, Artificial Intelligence Unit, University of Dortmund, Germany, 2004, pp. 1-28.
"A Brief Introduction to Graphical Models and Bayesian Networks", Murphy, Kevin, 1998, pp. 1-21.
"About Bayesian Belief Networks", B Net Builder, Charles River Analytics, Inc., 2004, pp. 3-14.

* cited by examiner

Steady State

| Date | Hour | Factory Production | Warehouse | NW Region | NE Region | SW Region | SE Region |
|---|---|---|---|---|---|---|---|
| | | 5 | | 50 | 50 | 50 | 50 |
| | | 10000 | 20000 | 2500 | 1500 | 3500 | 2500 |
| 1/1/2006 | 1 | 9994.31 | 20028.89 | 2528.36 | 1489.51 | 3473.34 | 2474.21 |
| 1/1/2006 | 2 | 9995.47 | 19963.16 | 2465.04 | 1505.79 | 3533.81 | 2556.55 |
| 1/1/2006 | 3 | 9994.89 | 19979.6 | 2583.09 | 1464.6 | 3403.83 | 2526.93 |
| 1/1/2006 | 4 | 9999.94 | 20083.87 | 2431.14 | 1470.47 | 3463.58 | 2530.48 |
| 1/1/2006 | 5 | 9998.72 | 19959.95 | 2544.25 | 1485.3 | 3597.96 | 2495.12 |
| 1/1/2006 | 6 | 10002.05 | 20031.39 | 2508.46 | 1459.1 | 3513.74 | 2449.31 |
| 1/1/2006 | 7 | 10004.87 | 20073.83 | 2531.54 | 1556.33 | 3466.57 | 2407.98 |
| 1/1/2006 | 8 | 9995.29 | 20123.04 | 2491.75 | 1470.13 | 3529.02 | 2455.18 |
| 1/1/2006 | 9 | 9994.73 | 20066.05 | 2556.96 | 1445.25 | 3485.45 | 2564.05 |
| 1/1/2006 | 10 | 10005.01 | 20024 | 2558.94 | 1607.39 | 3441.02 | 2439.71 |
| 1/1/2006 | 11 | 10002.81 | 20017.99 | 2502.23 | 1572.29 | 3435.2 | 2499.09 |
| 1/1/2006 | 12 | 9998.56 | 20065.07 | 2534.72 | 1422.22 | 3511.85 | 2482.69 |
| 1/1/2006 | 13 | 9996.06 | 20179.12 | 2491.01 | 1436.06 | 3431.49 | 2523.45 |
| 1/1/2006 | 14 | 9994.45 | 20177.3 | 2467.58 | 1439.98 | 3488.42 | 2600.29 |
| 1/1/2006 | 15 | 9997.38 | 20046.14 | 2506.85 | 1551.88 | 3492.04 | 2577.77 |
| 1/1/2006 | 16 | 10003.38 | 20014.64 | 2470.63 | 1545.93 | 3531.3 | 2487.02 |
| 1/1/2006 | 17 | 10007.56 | 19900.28 | 2493.39 | 1568.73 | 3554.17 | 2505.64 |
| 1/1/2006 | 18 | 9998.84 | 19913.25 | 2465.91 | 1473.96 | 3495.99 | 2550.01 |
| 1/1/2006 | 19 | 10002.14 | 19849.15 | 2523.84 | 1469.36 | 3536.33 | 2536.71 |
| 1/1/2006 | 20 | 10008.25 | 19990.4 | 2563.97 | 1403.62 | 3424.48 | 2474.93 |
| 1/1/2006 | 21 | 9986.94 | 19844.59 | 2482.81 | 1554.59 | 3552.86 | 2542.49 |
| 1/1/2006 | 22 | 10004.26 | 19910.53 | 2513.31 | 1430 | 3515.73 | 2479.28 |
| 1/1/2006 | 23 | 9999.73 | 19886.9 | 2507.33 | 1539.75 | 3486.51 | 2489.77 |
| 1/1/2006 | 24 | 9997.82 | 19834.49 | 2542.4 | 1521.53 | 3516.97 | 2469.33 |

SYSTEMS AND/OR METHODS FOR PREDICTION AND/OR ROOT CAUSE ANALYSIS OF EVENTS BASED ON BUSINESS ACTIVITY MONITORING RELATED DATA

FIELD OF THE INVENTION

The example embodiments disclosed herein relate to techniques associated with Business Activity Monitoring (BAM) and, more particularly, to systems and/or methods that process BAM-related data to predict when events of interest are about to happen and/or to identify the root causes of, or at least data correlated with, such events of interest. In certain example embodiments, key performance indicators (KPIs) are gathered and gardened. The gardened KPIs may be processed using a time-series transform, matched to one of a plurality of predefined waveforms, and fed into a Naïve Bayesian Network (NBN) for prediction. The gardened data also may be used to determine the relevance of the KPIs for root causes of problems (e.g., based on a chi-square analysis thereof).

BACKGROUND AND SUMMARY OF EXAMPLE EMBODIMENTS OF THE INVENTION

Business Activity Monitoring (BAM) provides a wealth of information about how business processes are currently performing as well as how such business processes performed in the past. Given such present and past information, it will be appreciated that it also would be advantageous to predict future events, both for business processes and system components. Armed with a knowledge of what might happen in the future, users thus could take steps to correct or ameliorate problems before they arise, thereby reducing the likelihood of such a problem ever occurring in reality. Conversely, it also might be possible to anticipate advantages in a down period and plan accordingly. Furthermore, it might be possible to program a system to take an appropriate action without direct user interaction.

Previous attempts have been undertaken to try to predict future events based on past and present data. However, further improvements to these basic techniques are still possible. For example, it would be advantageous to increase the accuracy of predictions. It also would advantageous to reduce the time taken to learn about the factors that cause, or at least are correlated with, events of interest. Additionally, learning algorithms with the BAM field have not been implemented for use substantially in real-time. Further, even where learning algorithms have been implemented, they have tended to be time- and resource-intensive.

Thus, it will be appreciated that there is a need in the art for systems and/or methods that overcome one or more of these and/or other disadvantages. It also will be appreciated that there is a need in the art for systems and/or methods that process BAM-related data to predict when events of interest are about to happen and/or to identify the root causes of, or at least data correlated with, such events of interest.

An example aspect of certain example embodiments of this invention relates to techniques for processing BAM-related data to predict when events of interest are about to happen and/or to help identify the root causes of, or at least data correlated with, such events of interest.

Another example aspect of certain example embodiments relates to gathering and gardening key performance indicators (KPIs), e.g., based on the mean and standard deviations thereof (e.g., in connection with Z-factors thereof) over one or more predefined collection intervals.

Another example aspect of certain example embodiments relates to the application of a time-series transform to gathered and gardened data, e.g., to make the data more discrete and comparable, and/or to reduce the impact of the different collection intervals of the same and/or different data sources. Such a transform may perform a correlation in the frequency domain.

Another example aspect of certain example embodiments relates to matching the gardened data to one or more of a plurality of predefined waveforms, e.g., to reduce the amount of data to be processed.

Still another example aspect of certain example embodiments relates to the use of a dynamically generated Naïve Bayesian Network (NBN) capable of performing prediction.

Still another example aspect of certain example embodiments relates to analyzing the root causes of problems (e.g., based on a chi-square analysis).

In certain example embodiments of this invention, a method of analyzing data in a business processing management environment is provided. A plurality of performance indicators are identified, with each said performance indicator being related to a process and/or system component. At least one rule is defined to monitor at least one said performance indicator of a process and/or system component. A prediction template is created to identify at least one rule on which to create a prediction. The prediction template includes a past interval indicative of an amount of data to be analyzed before making the prediction, a future interval indicative of how far into the future the prediction is to be made, and an accuracy threshold indicative of a probability level to be reached in making the prediction. Data is gathered for each said performance indicator over a plurality of collection intervals. The gathered data is gardened to discard gathered data within a normal operating range for a given collection interval. A time-series transform is applied to the gardened data to normalize any variations in collection intervals. The transformed gardened data is fed into a dynamically updatable Naïve Bayesian Network (NBN) such that an entry is created for the transformed gardened data when the NBN does not include an entry for the transformed gardened data, and such that an already existing entry for the transformed gardened data is updated when the NBN includes an entry corresponding to the transformed gardened data. The prediction is made and an accuracy thereof is determined using probabilities computed by the NBN. A relevance value associated with each performance indicator in a rule is updated using the gardened data for root cause analysis. The gathering and the making of the prediction are performed substantially in real-time.

In certain example embodiments, a system of analyzing data in a business processing management environment is provided. A performance indicator storage location stores a plurality of performance indicators, with each said performance indicator being related to a process and/or system component. A rules table includes at least one rule for monitoring at least one said performance indicator of a process and/or system component. A prediction templates table includes at least one prediction template for identifying at least one rule on which to create a prediction, with each said prediction template including a past interval indicative of an amount of data to be analyzed before making the associated prediction, a future interval indicative of how far into the future the associated prediction is to be made, and an accuracy threshold indicative of a probability level to be reached in making the associated prediction. There is provided a connection to a data stream, with the data stream including data for each said performance indicator over a plurality of collection intervals. A gardening module is configured to garden the data in the data stream to discard data within a normal operating range for a given collection interval. A time-series transformation engine is configured to apply a time-series transform to the gardened data to normalize any variations in collection intervals. A dynamically updatable Naïve Bayesian Network (NBN) is configured to receive the transformed gardened data such that an entry is created for the transformed gardened data when the NBN does not include an entry for the transformed gardened data, and such that an already existing entry for the transformed gardened data is updated when the NBN includes an entry corresponding to the transformed gardened data. A prediction engine is configured to make the prediction and to determine an accuracy thereof using probabilities computed by the NBN, and further configured to update a relevance value associated with each performance indicator in a rule using the gardened data for root cause analysis. The gardening module and the prediction engine operate substantially in real-time.

In certain example embodiments, there is provided a prediction engine comprising programmed logic circuitry configured to make a prediction pertaining to a predefined event of interest and to determine an accuracy thereof using probabilities computed by a dynamically updatable Naïve Bayesian Network (NBN) populated with vector-quantized, time-series transformed, gardened performance indicator data relevant to the event of interest, and further configured to update a relevance value associated with each said performance indicator using the gardened data for root cause analysis. The prediction engine is further configured to operate substantially in real-time.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 7 is an example steady state table of values streaming into an example prediction engine in connection with the illustrative scenario of FIG. 6, in accordance with an example embodiment;

FIG. 10 is an illustrative data structure for a Naïve Bayesian Network in accordance with certain example embodiments.

DETAILED DESCRIPTION OF EXAMPLE EMBODIMENTS OF THE INVENTION

Figure 1:
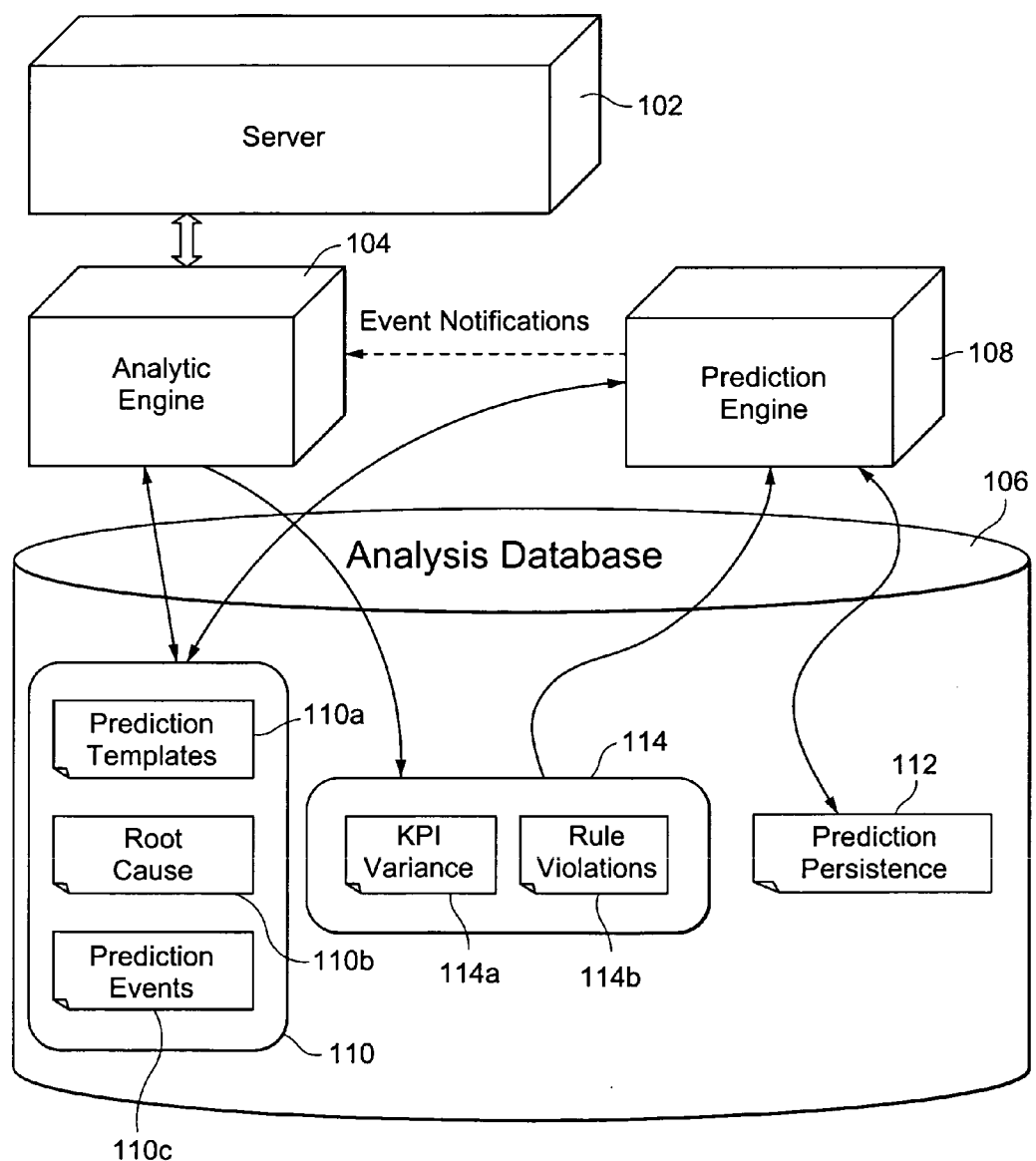
FIG. 1 is a high level view of an example processing environment that includes a prediction engine in accordance with an example embodiment.

Business Activity Monitoring (BAM) provides a wealth of information about how business processes are currently performing as well as how such business processes performed in the past. For example, BAM-related data may come in the form of key performance indicators (KPIs). A key performance indicator (KPI) is a measurement of a system and/or business activity that is important to the success of an organization. KPIs may monitor quantitative business and system data metrics. Examples of business metrics may include, for example, revenue, volume of orders, queue length, cycle time, etc., and examples of system metrics may include, for example, memory utilization, CPU resources, etc. KPIs may be combined and organized in different ways to produce an accurate view of system and/or business activities.

Rules may be created to watch for certain interesting patterns in KPIs and may notify users when these patterns are detected. The occurrence of an event corresponding to a rule indicates that a pattern has been recognized in the KPI data stream. For example, the rule may indicate that a resource has reached a critically low threshold. A rule violation may indicate that something out of the ordinary has happened to the system or business process. For example, in the business world, a rule violation may occur when orders are not being processed on time, revenue for a particular product line does not meet predefined goals over a set time period, etc. In the system world, for example, a rule violation may occur when a software or hardware component fails, when memory or CPU resources become exhausted in a particular timeframe, etc.

When a rule violation occurs, definitionally, there is no way to control the cause(s) of the rule violation so as to prevent the rule violation from occurring, since it already has occurred. Thus, it will be appreciated that prediction, including the forecasting of rule violations and/or the generation of warnings, may advantageously help reduce the likelihood of a rule violation occurring, as such advance notification may allow ameliorative action(s) to be taken in advance of the rule violation.

Accordingly, one aspect of certain example embodiments relates to a prediction engine configured to learn from past experiences. When such an example prediction engine has learned enough, it may be able to provide a warning that a rule violation is about to be generated before such a rule violation is generated. As the example prediction engine tracks a rule and KPI values leading up to a rule violation, it may tabulate the relevance of all KPIs that contributed to the violation. This technique may include determining the relevance of KPIs that are not explicitly a part of the rule definition itself. Thus, in certain example embodiments, the prediction engine may correlate changes in the values of identified and/or non-identified KPIs with rule violations. These correlations also may be useful in helping users determine the root cause(s) of certain rule violations.

The prediction engine of certain example embodiments therefore may predict when a rule may go out of compliance and compute the probability of such a violation within a given timeframe, and/or provide relevance values for the KPIs contributing to a rule violation that has happened in the past. Thus, advantageously, it may be possible to predict the occurrence of undesirable events and take corrective action before such events ever occur in reality, potentially leading to cost savings, increased "up-time," a better understanding of business processes and/or the relationships among and/or between one or more components or sub-processes, and/or the like.

To this end, events and conditions are fed into a prediction engine in certain example embodiments. In certain example implementations, the prediction engine includes and/or is in communication with a number of hardware, software, firmware, and/or other components. A gardening algorithm may be applied to filter the events for relevance. A transform may pre-process the events over a time range. For example, a Fast Fourier Transform (FFT) may be applied to make the data more discrete over a time range and/or to perform a correlation in the frequency domain to determine which waveform the signal most closely resembles, thus categorizing the signal, thereby compressing the data. The transformed results may be fed into a Naïve Bayesian Network (NBN). The NBN allows inputs to change over time instead of being fixed, which advantageously allows for the processing of an extremely large set of possible input events so that, for example, the NBN allows those events that are no longer relevant to be weeded out, thus changing the inputs. In turn, the results from the NBN may be back-propagated to the gardening algorithm. This back-propagation helps the prediction engine of certain example embodiments "learn" over time.

During this learning process, the prediction engine also may examine the current set of events and conditions. The events and conditions may be processed by the NBN to predict, within a user-defined accepted level of accuracy, whether a rule violation will occur. If a rule violation is predicted, an alert may be raised, corrective action may be taken automatically (e.g., without direct human intervention), etc.

1. Example System Components 1.1 Example Processing Environment

FIG. 1 is a high level view of an example processing environment that includes a prediction engine in accordance with an example embodiment. The server 102 is the primary interface between users and the system. It communicates with the analytic engine 104 through a set of web service interfaces. The analytic engine 104 stores information 114 to and retrieves information 114 from the analysis database 106. In general, the analytic engine 104 may receive business, system, and/or process data from the server and save such data in the analysis database 106. The analytic engine 104 may include, for example, an event handler to receive business and/or system data. Business data includes, for example, underlying data that make up a business process, such as revenue and order numbers. System data includes, for example, data about equipment or applications, such as queue length and whether a managed component is online or offline. The analytic engine 104 also may include, for example, a process tracker to receive business process data. As a process executes the process tracker may, for example, take measurements about the process instance and its steps, such as, for example, wait time, cycle time, etc. This information may be used to track performance of a business process or to cause alerts when certain conditions exist, such as performance degradation or a failure in process execution. Further, the analytic engine 104 may include an analysis engine to run algorithms on the data and/or a rules engine to compare the data it receives to rules to detect when a process or resource requires attention, e.g., from a user. Based on this and/or other data, the analytic engine 104 may store KPI variance information 114a and/or rule violations information 114b to the analysis database 106.

Data may be evaluated against rules. A rule identifies a significant condition under which a process or resource becomes problematic, requires attention, and/or is of interest. A rule can be configured to alert users or take programmatic action when the condition occurs. Rules also may be configured to send user alerts when the process or resource returns to compliancy. KPI rules apply to KPIs that were created for business and/or system data. Data may be evaluated against a KPI rule over one or more intervals according to the collection interval specified when the KPI was first created. Event rules and threshold rules differ from KPI rules in that data points may be evaluated against the rule as they are collected (e.g., substantially in real time) rather than waiting for a KPI collection interval (e.g., an aggregation of data points collected over an interval). Event and threshold rules generally apply to types of data that require an immediate response, such as, for example, an application unexpectedly shutting down or CPU usage exceeding unacceptable limits.

A prediction process mediated by a prediction engine 108 may be used to identify problems in an environment so that the underlying issues that cause the problem can be addressed. As the same problems recur, they provide clues that allow the prediction engine 108 to learn the causes of the problems. As the prediction engine 108 learns, it may actually generate a warning before problems happen, so that preemptive action may be taken. In certain example embodiments, the prediction engine 108 mainly operates on tables 110 (including, for example, prediction templates table 110a, root cause table 110b, prediction events table 110c, and/or the like) in the analysis database 106 using this information and/or information 114, including, for example, KPI variance information 114a and/or rule violations information 114b.

As noted above, the prediction engine 108 may be used to make predictions, and prediction templates (described in greater detail below) specify the predictions to make. The prediction engine 108 predicts events using patterns that it discovers among rules and many KPI values. The prediction engine 108 learns which patterns precede important events and uses an automated learning algorithm to generate reasonably accurate predictions, the reasonableness of the predictions being a user-definable attribute of the learning algorithm. When a prediction template is created, the rule on which the prediction is to based is identified, as are the past and future timeframes for the prediction, and the relative accuracy that must be achieved before predictions will be made.

If a problem is predicted, prediction analysis information may be generated. If a problem results in a rule violation, root cause information may be generated. Such information may help determine the cause(s) of the problem so that corrective action can be taken. For example, root cause analysis may reveal a possible course of action to take to correct the problem, and/or root cause analysis results may be used to refine the prediction template to achieve more useful predictions and root cause analyses in the future. Thus, the prediction engine 108 may also send event notifications including prediction event notifications to the analytic engine 104 via web service interface as predictions are made. The prediction engine 108 also may be persisted in persisted predictions table 112 in the analysis database 106.

1.2 Example Prediction Template Creation

This section demonstrates how a prediction template may be created and where KPI values and rule violations may be stored over time.

To start generating predictions based on a rule, a prediction template may be created. Prediction templates may be user-defined and/or system-generated. After a prediction template has been created, it may be placed in analysis database 106 (e.g., in the prediction templates table 110a) where the prediction engine 108 has access to it.

The following properties may be associated with each prediction template:

Template Name: The name of the template.

Description: A description of the template.

Rule Name: An indication of the base rule to be used by the template, which is the rule upon which the prediction will be based. The prediction engine may evaluate each instance of this rule to predict the next time the rule will be violated.

Future Interval: Specifies how far into the future (e.g., 15, 30, 45, 60 minutes, etc.) to predict the event specified in the base rule.

Past Interval: Specifies how far into the past (e.g., 15, 30, 45, 60 minutes, etc.) to analyze data before a prediction is made. The farther into the past data is analyzed relative to how far into the future to events are to be predicted, the more accurate the prediction is likely to be and the faster the prediction engine will learn.

Threshold: Specifies how accurate the prediction should be (e.g., 0%, 10%, 20%, 30%, etc.). The higher the accuracy, the higher the confidence has to be before a prediction is made, but the longer it will take to learn before making the prediction.

Accuracy/Threshold: Current cumulative accuracy achieved by this template/Threshold of accuracy that must be attained before predictions are made.

Learning Active: Indicates whether the prediction engine is actively learning, and is tied to the base rule that is being predicted such that if the rule is enabled, learning will occur; if the rule is disabled, learning will no longer occur.

Prediction Active: An indication as to whether the prediction engine has learned enough to make accurate external predictions.

Last Prediction: The date and/or time of the last prediction made for this template.

KPIs: The number of KPIs currently under evaluation to learn to predict that this base rule will be violated. It will be appreciated that this value is proportional to the amount of memory and computational resources used by this template.

Rule Instances: The number of rule instances of the base rule associated with this template currently being evaluated.

As the time goes on, the analytic engine 104 will store new values for KPIs and rule violations in the analysis database 106. The analytic engine 104 may keep track of statistical measures, such as, for example, variance and standard deviation (e.g., as KPI variance information 114a) in the analysis database 106, along with actual KPI values. As will be described in greater detail below, the prediction engine 108 is concerned with KPIs that are out of their "normal range." As will be described in greater detail below, the determination as to whether a KPI is outside of its normal range may be based on, for example, its mean and standard deviation over a collection interval.

1.3 Example Prediction Engine Polling Loop

The prediction engine 108 runs in a polling loop such that it wakes up on a predefined polling interval (e.g., at 5, 10, 15, etc., minute intervals). Each time it runs, the prediction engine 108 goes through all of the prediction templates stored in the prediction templates table 110a in the analysis database 110 and correlates KPI variances with rule violations. As a result, it produces updates to the prediction templates table 110a, as well as the root cause table 110b and the prediction events table 110c. In addition to putting prediction events in the analysis database 106, the prediction engine 108 also sends events to the analytic engine 104, e.g., via web service calls. At the end of each polling cycle, the prediction engine 108 stores its state into the prediction persistence tables 112. This allows the prediction engine 108 to maintain its learned state between system reboots or outages.

1.3.1 Example Startup and Polling Sequences

Figure 2:
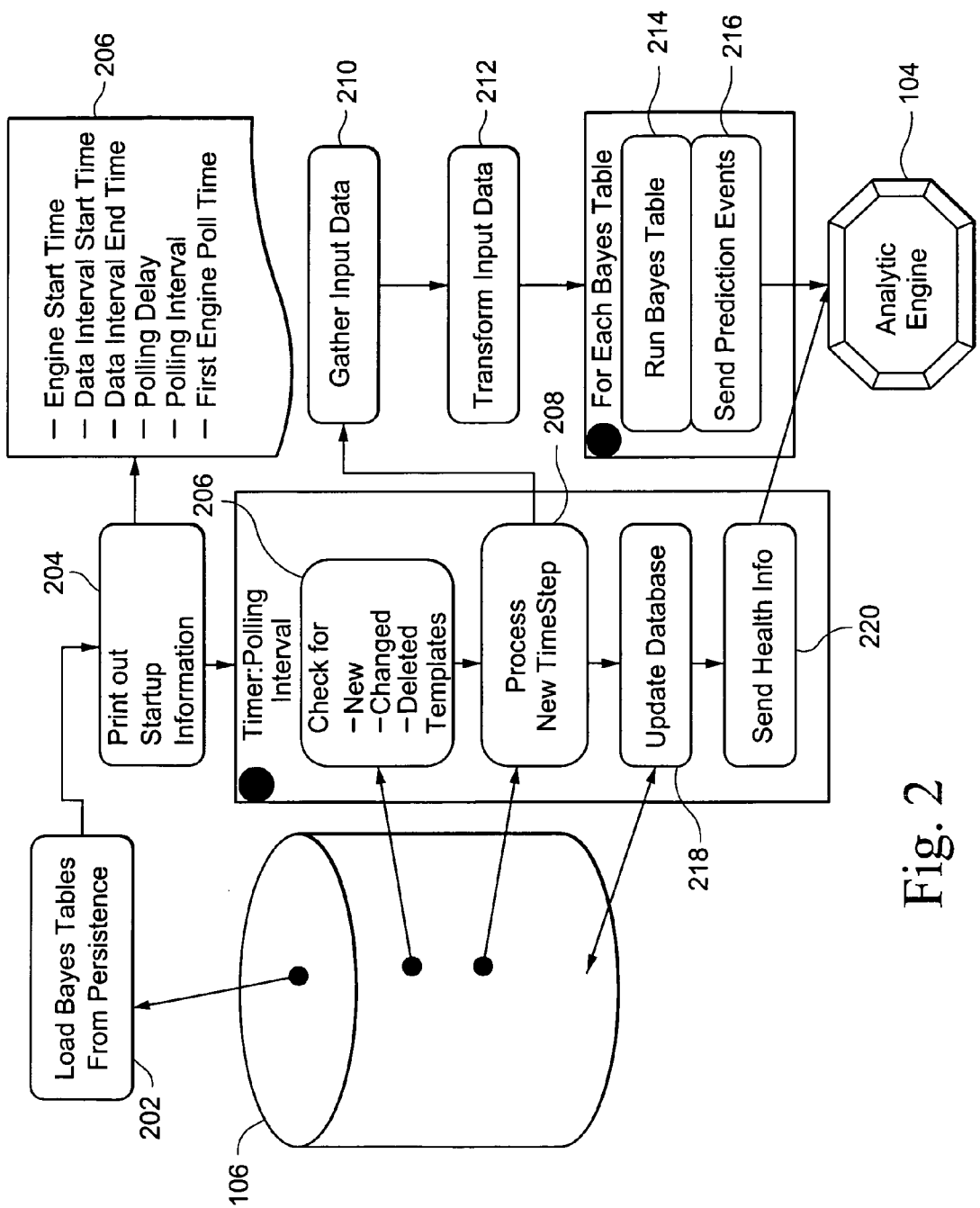
FIG. 2 illustrates the processes that occur when an example prediction engine starts up and proceeds through an illustrative polling cycle, in accordance with an example embodiment.

FIG. 2 illustrates the processes that occur when an example prediction engine 108 starts up and proceeds through an illustrative polling cycle, in accordance with an example embodiment. The prediction engine state (e.g., as stored in prediction persistence table 112) is read out of the analysis database 106 (202). This restores the state of learning to where it was before the reboot. Some starting information may be output and/or logged at this time (204). For example, the following information (206) may be output or and/logged at startup:

Engine Start Time: The time that the engine started.

Data Interval Start Time: Interval time for the start of data collection.

Data Interval End Time: Interval time for the end of data collection.

Polling Delay: The amount of delay before entering the polling loop. It may be advantageous in certain example embodiments to delay some amount of time beyond the polling interval boundary before querying for data, e.g., to ensure that KPI information has been committed by the analytic engine before the prediction engine queries for it.

Polling Interval: The predefined length of the polling interval.

First Engine Poll Time: The time at which the prediction engine will begin its first polling loop.

Once the prediction engine 108 has gone through its startup routine, it waits for the first polling interval. At the start of each polling interval, it checks for new, changed, and/or deleted templates (206). Such changes may be initiated via a user interface. After processing changes made by the user, the new timestep is processed (208). The prediction engine 108 gathers data via database queries (210), transforms that data (212), and runs the transformed data against each Bayes table (described in greater detail below). As each Bayes table is run (214), the prediction engine 108 decides whether to produce prediction events. If prediction events are produced, they are sent to the analytic engine 104 (216), e.g., via web service calls.

During or after the processing of the timesteps, the prediction engine 108 updates (218) the tables in the analysis database 106 (e.g., the prediction templates table 110a, the root cause table 110b, the prediction events table 110c, etc.). Health information is sent to the analytic engine 104 (220), e.g., via web service calls.

1.3.2 Example Database Queries

Certain example embodiments implement two kinds of database queries—namely, attribute queries and rule queries.

With respect to attribute queries, the prediction engine 108 considers KPIs to be attributes. Once inside of the prediction engine 108, three basic types of attribute data are queried for from the analysis database 106. First, new attributes are attributes that have an above or below "normal" diagnosis since the last polling cycle. As data flows into the system, the analytic engine 104 computes statistics for such data, including, for example, a mean and standard deviation. Thus, above and below normal diagnoses may be rendered when the current value is within a predetermined number of standard deviations (e.g., 2 standard deviations) from the mean. New attributes may be added to the master list of attributes that are used for learning and prediction. An implication of this technique is that the prediction engine 108 only considers attributes that have reached or exceeded these bounds. This may advantageously reduce the amount of data to be processed and/or help to focus on those KPIs that are suspected to be more important than others.

Figure 3:
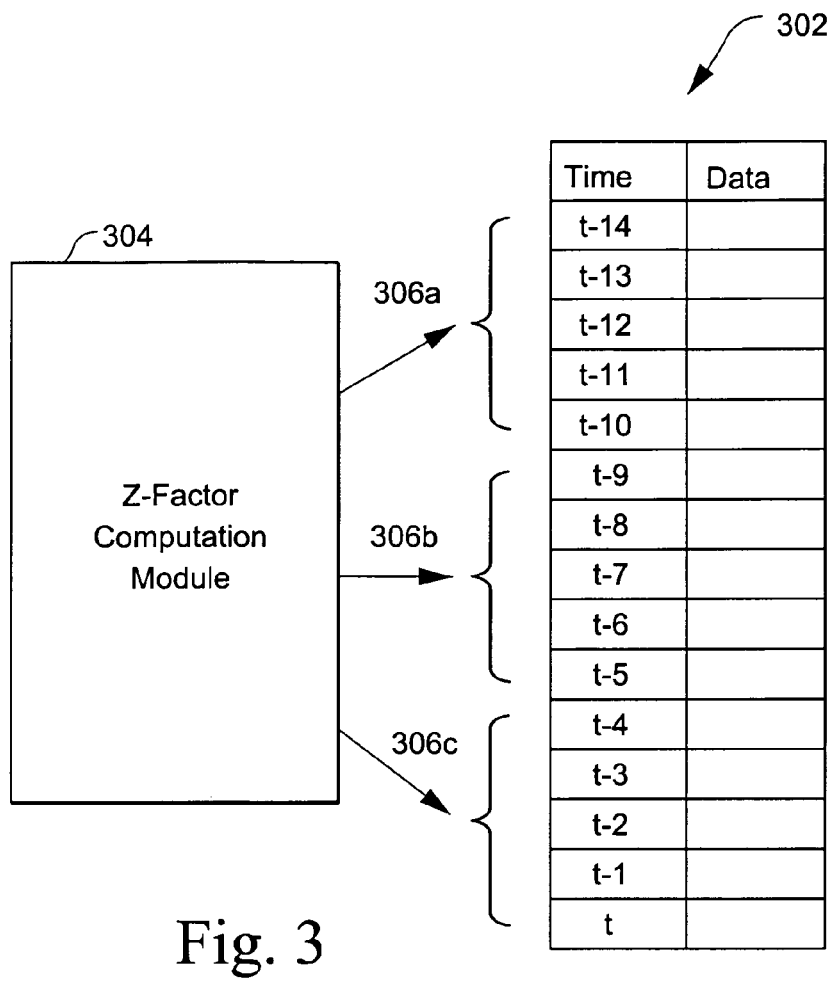
FIG. 3 shows an illustrative process for calculating Z-factors over a time period, in accordance with an example embodiment.

A second type of attribute data queried from the analysis database 106 is attribute values. The prediction engine 108 looks for statistical deviations in data values, using a Z-factor instead of the actual data value. The Z-factor is defined by the equation: (raw data value—mean)/standard deviation. FIG. 3 shows an illustrative process for calculating Z-factors over a time period, in accordance with an example embodiment. The calculation of Z-factors involves a data stream 302 including KPI data and corresponding time stamps. As shown in FIG. 3, a 15 minute data stream 302 is collected, although the present invention is not limited to this length of time. A Z-factor computation module 304 is set to determine Z-factors for KPIs over a predetermined time interval which, in FIG. 3, is set to five minutes. Means and standard deviations are calculated for each period 306a-c. The Z-factors are calculated based on the raw KPI data values in the data stream 302 and the particular mean and standard deviation associated with the time frame in which the raw KPI data value was captured.

A third type of attribute data queried from the analysis database 106 is missing values attributes. It is sometimes the case that no data comes in for an attribute during its collection interval. The prediction engine 108 may detect this lack of data as a missing value. As an example, consider two attributes, a first attribute that has a one minute collection interval and a second attribute that has a ten minute collection interval. It is expected that the one minute attribute will receive a value each minute, while the ten minute attribute will receive a value every ten minutes. The challenge for the query here is that it must detect when a ten minute value is missing from the data stream.

The prediction engine 108 queries for rule violations that occurred during the polling interval, as well as new prediction conditions that have come into existence. A rule violation is included if it went out of compliance anytime before the end of the polling interval. The prediction engine 108 queries for two basic cases. A first basic case relates to rules that went out of compliance during the interval. Here, to be considered a violation, the rule instance must have a violation start time that is less than or equal to the end time of the interval and must have an end time that is greater than the start time of the interval.

A second basic case relates to new rule instances that came into existence since the last polling interval. This case can be further divided into two situations. First, the rule went out of compliance and back in one or more times during the interval. Such behavior will be counted as a single violation, even if it oscillated several timed during the interval. Second, the rule went out of compliance and is still out of compliance at the end of the interval.

Figure 4:
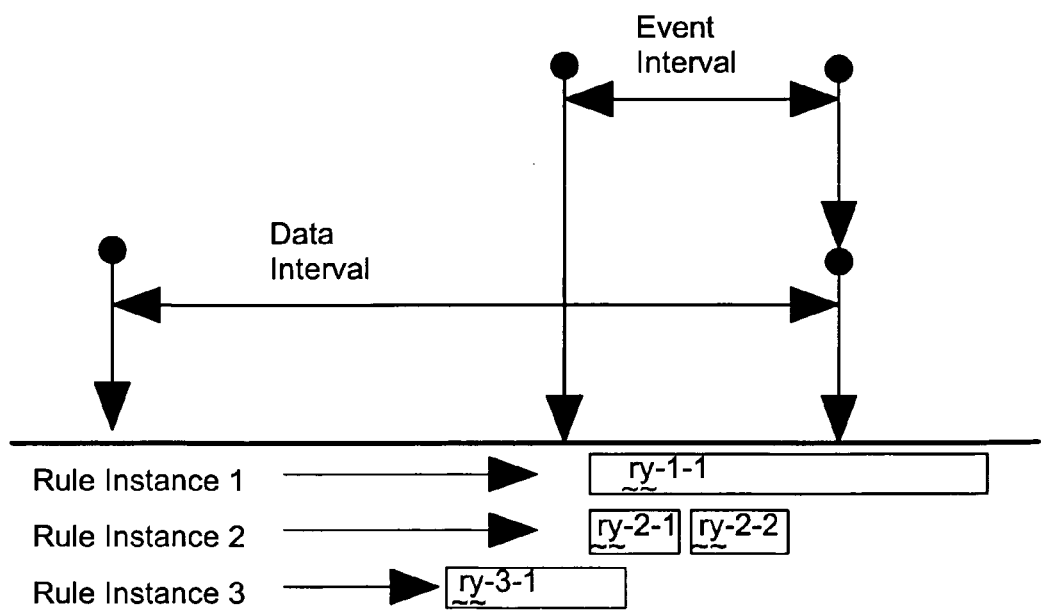
FIG. 4 is an illustrative view of various rule instance violations over illustrative data and event intervals, in accordance with an example embodiment.

FIG. 4 is an illustrative view of various rule instance violations over illustrative data and event intervals, in accordance with an example embodiment. In FIG. 4, the violation of rule instance 1 matches the second situation of second type of query, as rule instance 1 went out of compliance during the event interval and is still out of compliance at the end of the data and event intervals. The violation of rule instance 2 matches the first situation of the first type of query, as rule instance 2 went in and out of compliance twice during the event interval. The violation of rule instance 3 corresponds to the first type of query, as the start time of the violation is less than the end time of the event interval and has an end time greater than the start time of the event interval.

Figure 5:
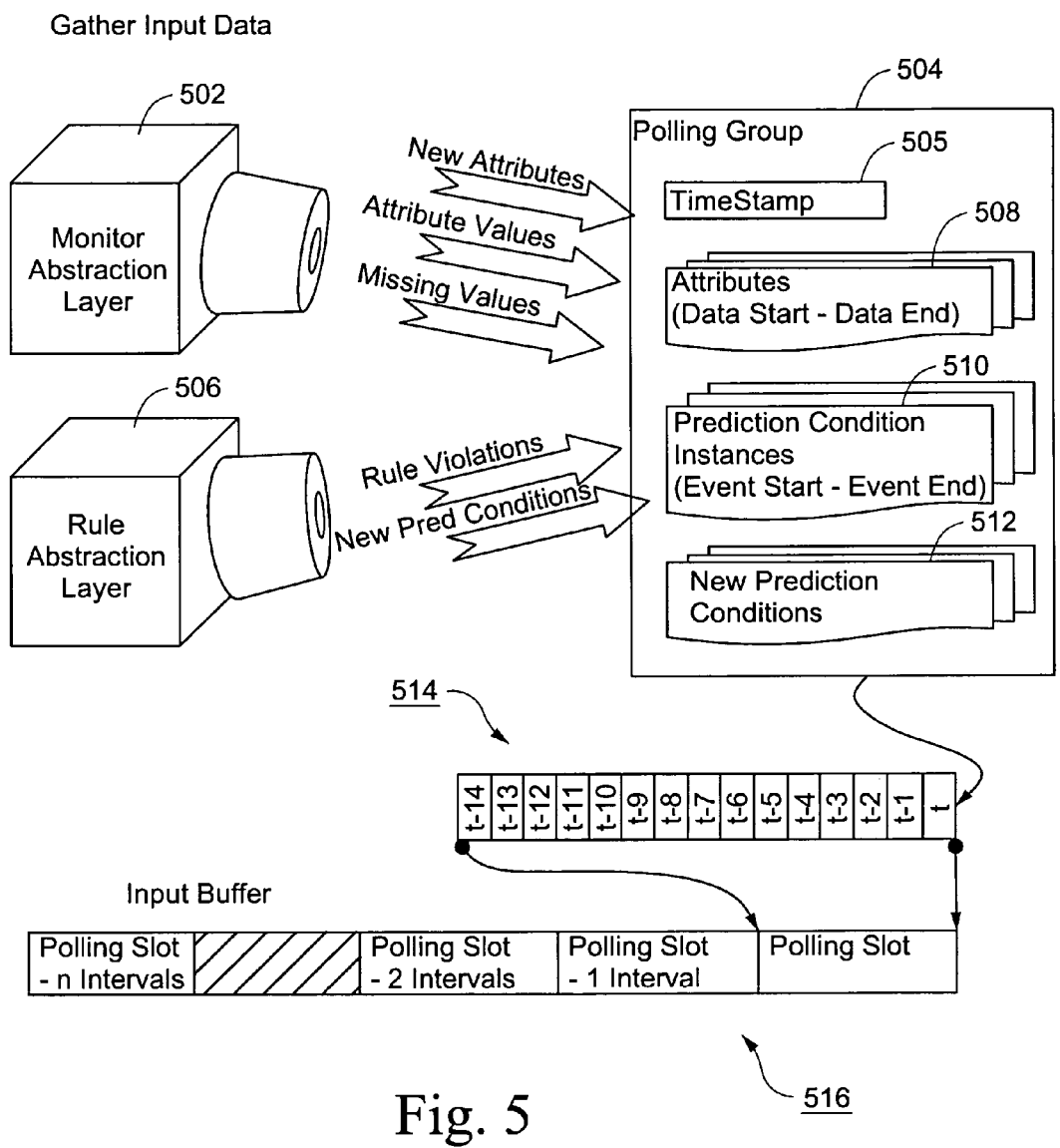
FIG. 5 is an illustrative view of the monitor and rule abstraction processes in accordance with an example embodiment.

FIG. 5 is an illustrative view of the monitor and rule abstraction processes in accordance with an example embodiment. In FIG. 5, a monitor abstraction layer 502 produces new attributes, attribute values, and missing values for inclusion in a polling group 504. Similarly, a rule abstraction layer 506 produces rule violations and new prediction conditions for inclusion in the polling group 504. Each polling group 504 includes a timestamp 506. Attributes 508 are included, as previously noted, over a predetermined start and end range. Existing prediction conditions 510 as well as new prediction conditions 512 also are associated with a polling group 504. Each polling group is associated with a respective collection interval 514, which is also associated with a time-series transformed polling slot, e.g., to reduce the problems associated with potential differences in collection intervals and/or amounts of data streaming in.

1.4 Example BAM Scenario

This section presents a business scenario that uses an illustrative prediction template to predict business step failures based on past experience. In particular, FIG. 6 is a view of an ice cream distribution scenario, in accordance with an example embodiment, and FIG. 7 is an example steady state table of values streaming into an example prediction engine in connection with the illustrative scenario of FIG. 6, in accordance with an example embodiment.

Figure 6:
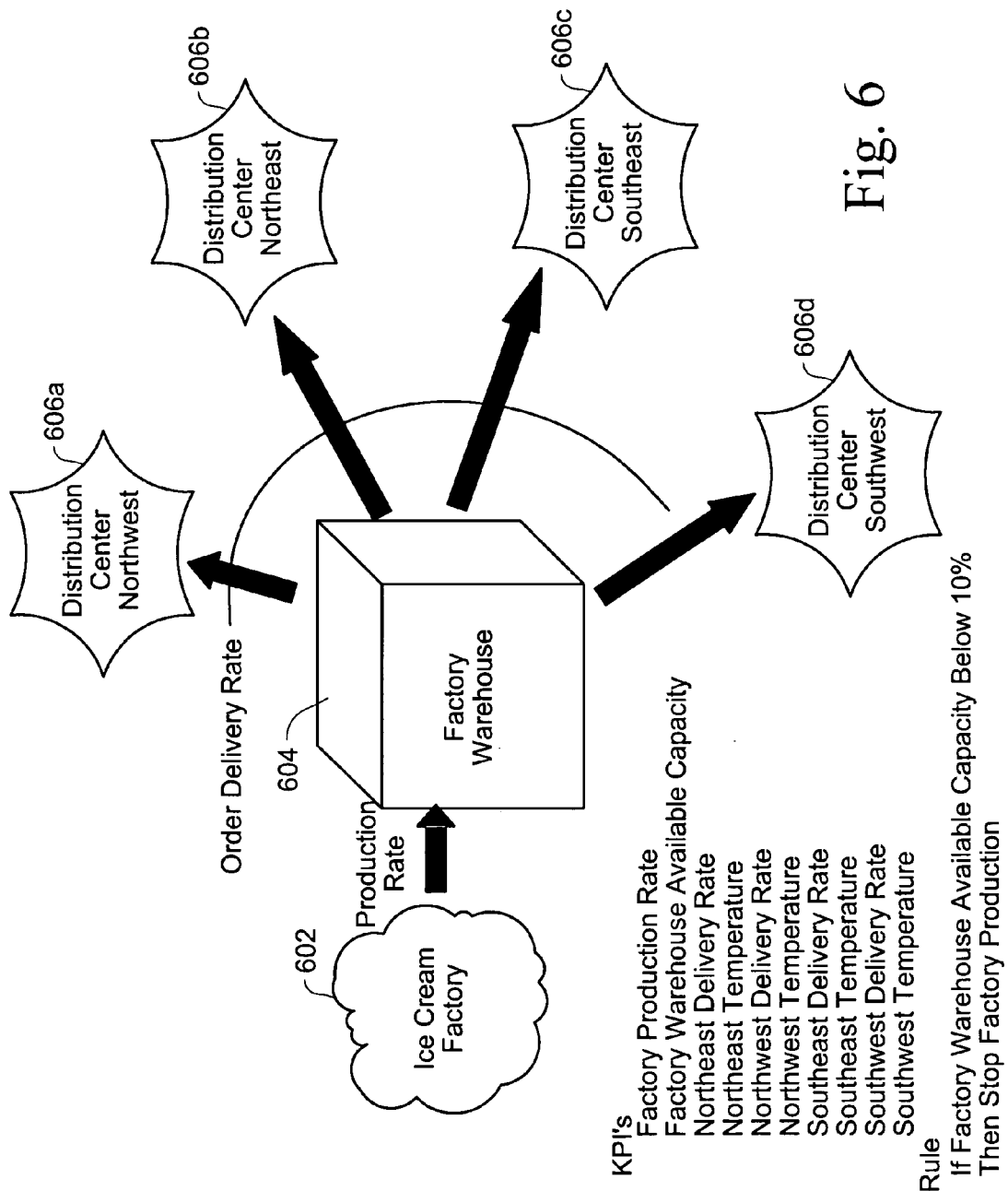
FIG. 6 is a view of an ice cream distribution scenario, in accordance with an example embodiment.

In FIG. 6, the Ice Cream Factory 602 has a large factory warehouse 604 and four regional distribution centers 606a-d. The following KPIs are defined for the Ice Cream Factory: Production Rate and Available Capacity. For each of the four (Northwest, Northeast, Southeast, Southwest) distribution centers 606a-d, the following KPIs are defined: Delivery Rate, Ambient Temperature.

It is assumed for the sake of this illustrative example that if available capacity of the factory 604 drops below 10%, the company is close to running out of product to sell. When the warehouse is out of ice cream, the company looses money, so this situation is disadvantageous and should be avoided if possible. It is further assumed for the sake of this illustrative example that sometimes, there is a heat wave that passed across both the Northwest and Northeast regional distribution centers. When this happens, they tend to order more ice cream than usual, and this event can cause supplies in the factory warehouse to fall, reducing available capacity below the 10% threshold. If the company were able to predict larger orders, it could increase factory production or increase prices to increase profits.

The following steps illustrate how to set up the prediction engine of certain example embodiments to predict when the factory will fall below 10% capacity:

Create the following KPIs:
    Factory Production Rate (Count, Bars Per Hour)
    Factory Warehouse Available Space (Count, Percent)
    Northwest Delivery Rate (Count, Bars Per Hour)
    Northwest Ambient Temperature (Count, Temperature F)
    Northeast Delivery Rate (Count, Bars Per Hour)
    Northeast Ambient Temperature (Count, Temperature F)

Southwest Delivery Rate (Count, Bars Per Hour)
Southwest Ambient Temperature (Count, Temperature F)
Southeast Delivery Rate (Count, Bars Per Hour)
Southeast Ambient Temperature (Count, Temperature F)
Create a rule on Factory Warehouse Available Space that will fire when its value falls below 10%.
Generate data in the following way:

| KPI | Value |
| --- | --- |
| Factory Production Rate | Constant about a mean of 10000 bars per Hour. Start production one hour before the regions start pulling ice cream bars out to prime the factory warehouse. |
| Northwest Delivery Rate | 12 hours 2500 bars per hour |
| | 4 hours 5000 bars per hour |
| | 6 hours 2500 bars per hour |
| Northeast Delivery Rate | 12 hours 2500 bars per hour |
| | 4 hours 5000 bars per hour |
| | 6 hours 2500 bars per hour |
| Southwest Delivery Rate | 24 hours 2500 bars per hour |
| Southeast Delivery Rate | 24 hours 2500 bars per hour |

Data would be gathered, similar to as shown in FIG. 7. The data could be broken down into timeframes, and means and standard deviations could be calculated for each such timeframe. Thus, the data is now ready for the prediction analysis techniques of certain example embodiments, described in greater detail in the following sections.

2. Example Prediction Process Overview

Figure 8:
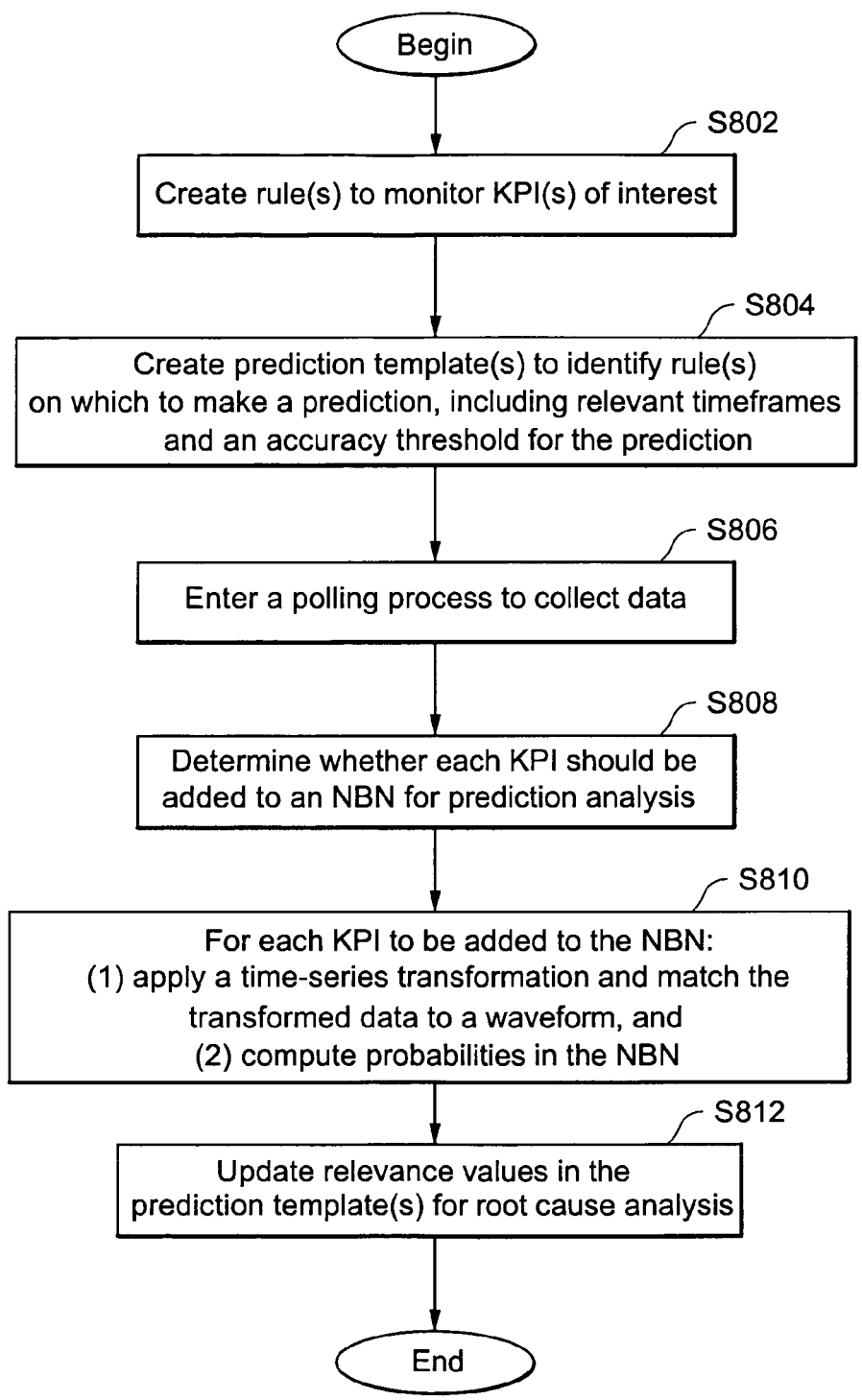
FIG. 8 is an illustrative flowchart showing an example prediction process in accordance with an example embodiment.
Figure 9A:
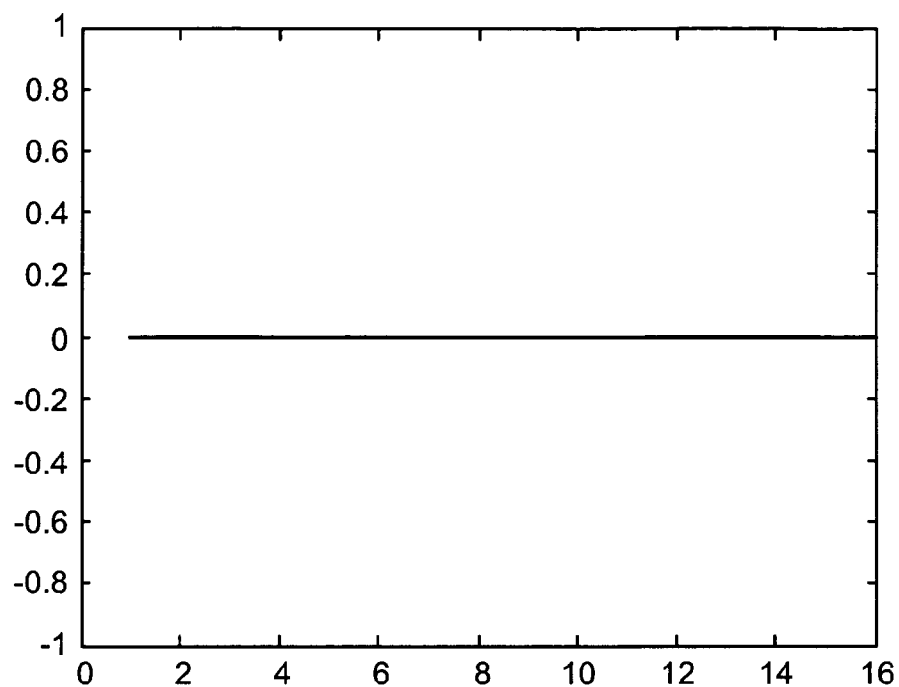
FIGS. 9a-m are illustrative waveforms to which transformed KPI data may be matched in accordance with certain example embodiments.
Figure 9B:
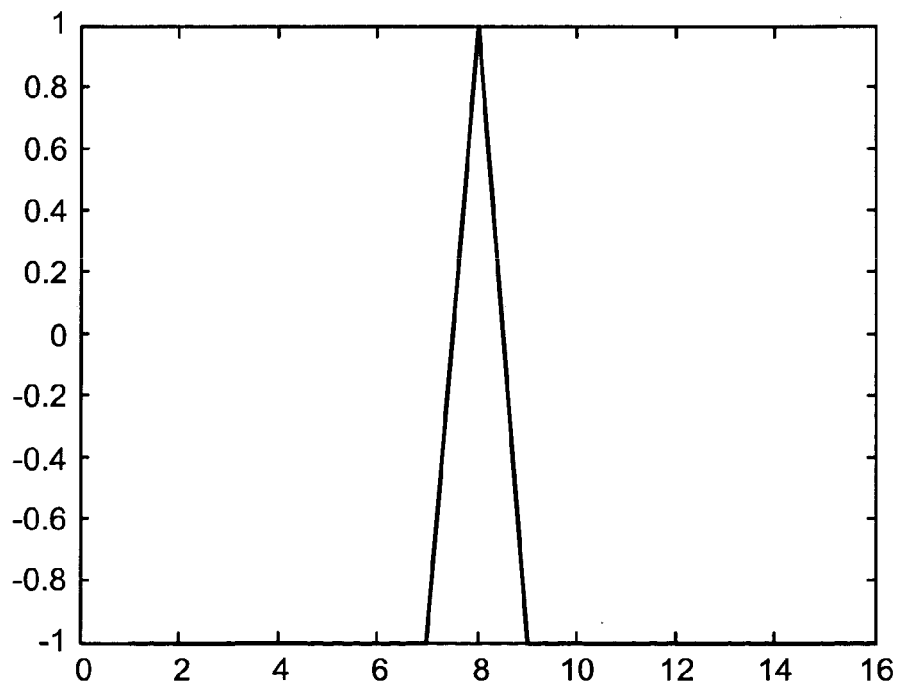
Figure 9C:
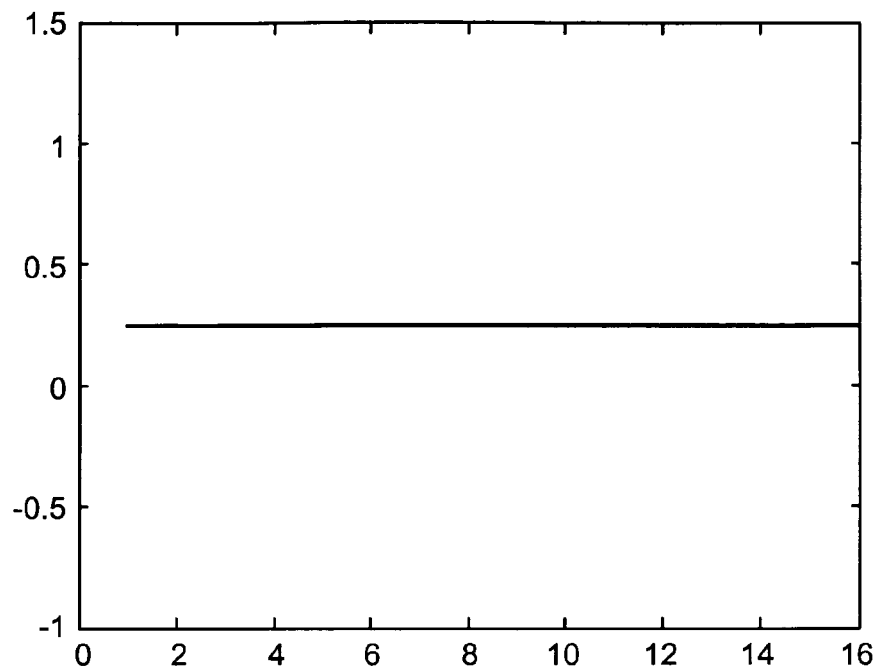
Figure 9D:
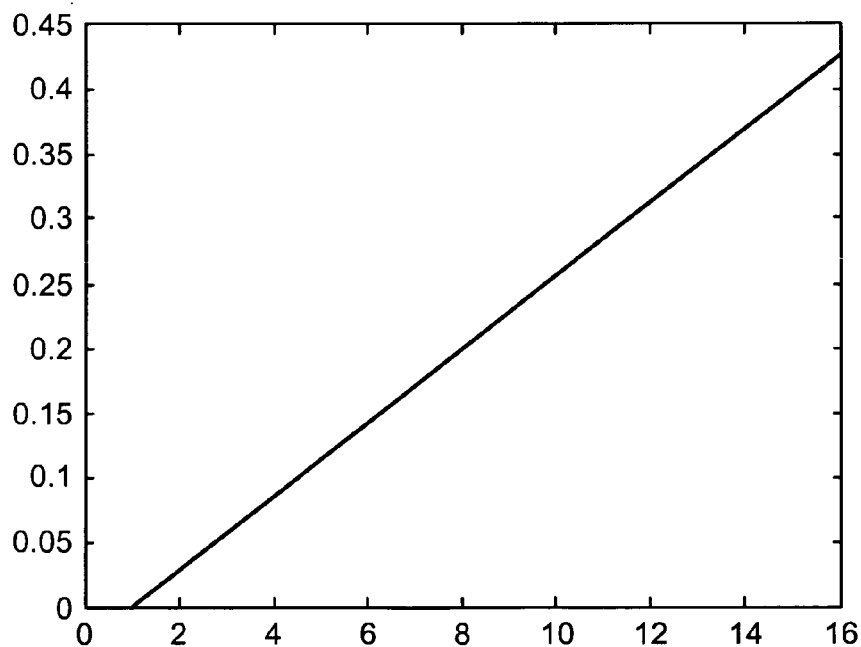
Figure 9E:
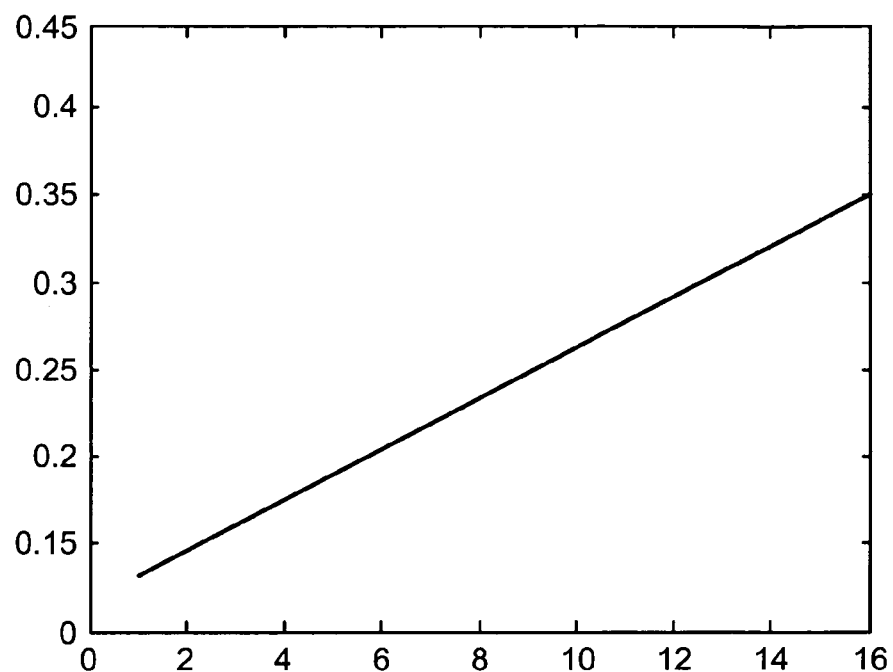
Figure 9F:
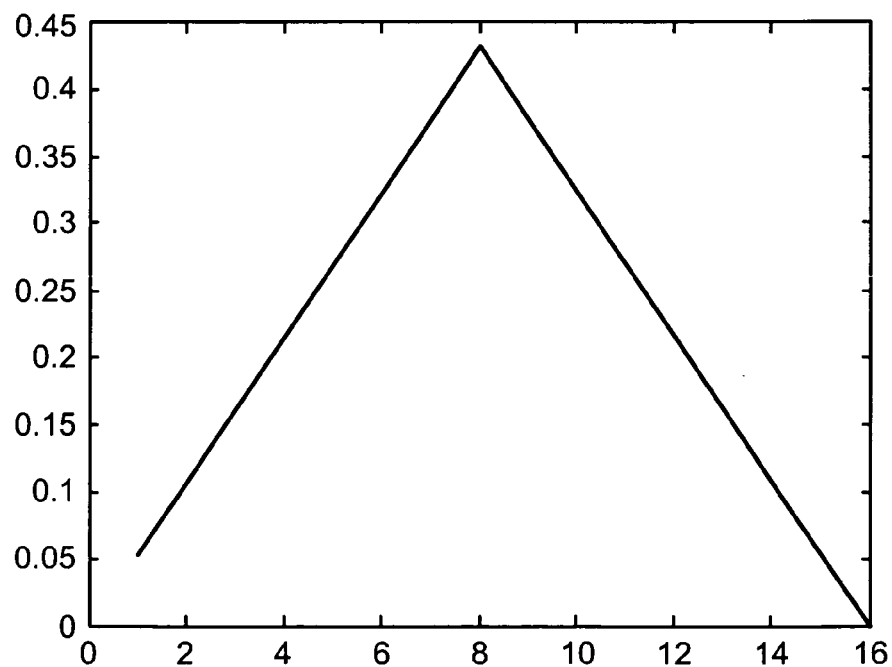
Figure 9G:
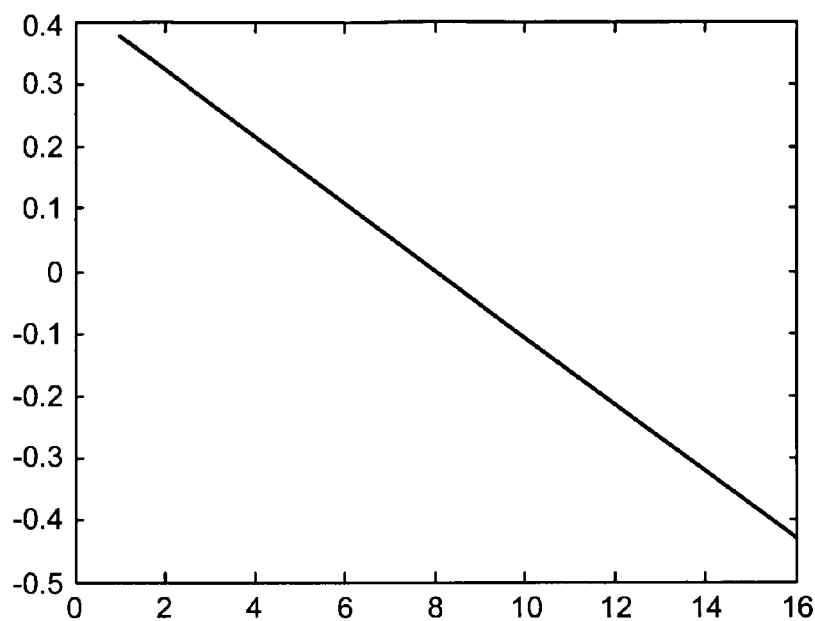
Figure 9H:
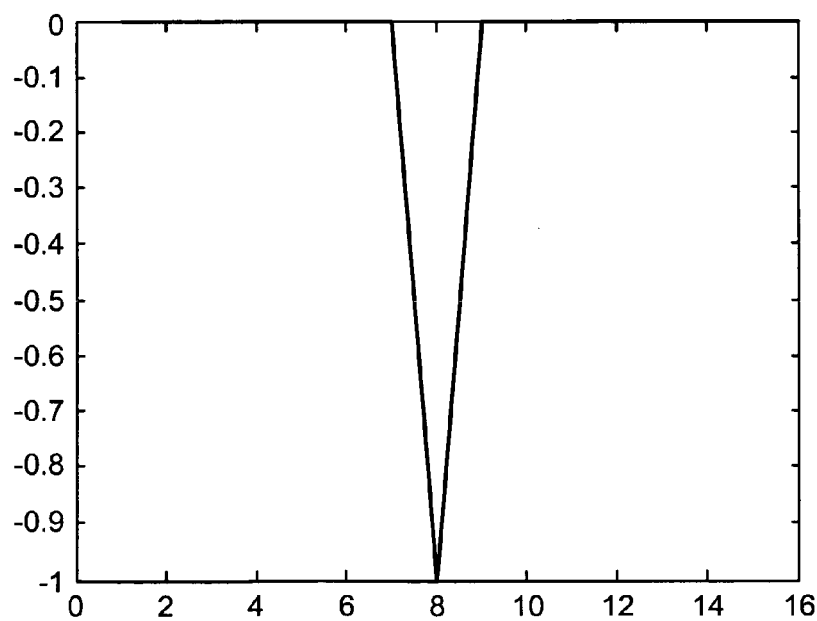
Figure 9I:
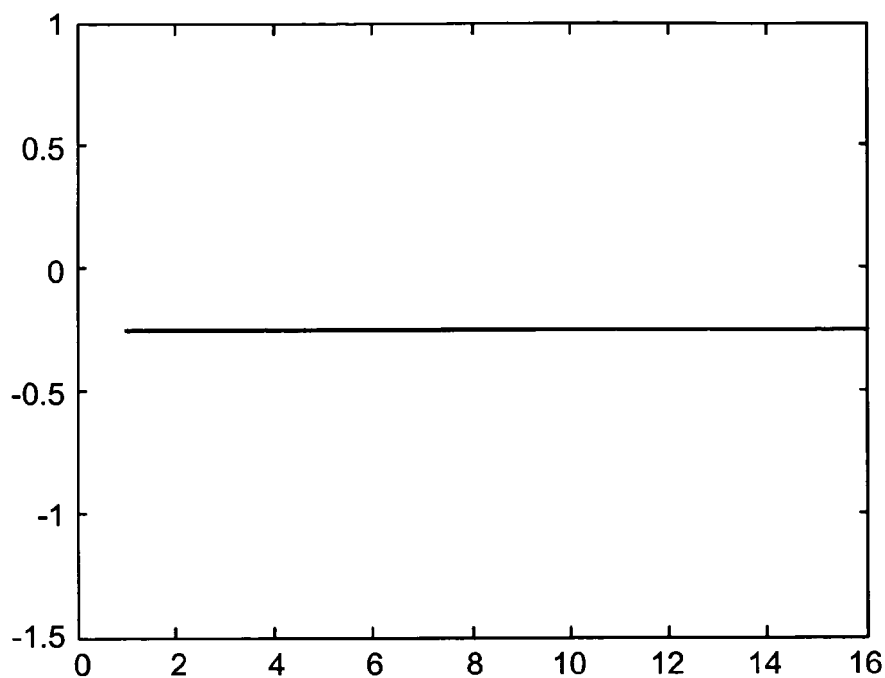
Figure 9J:
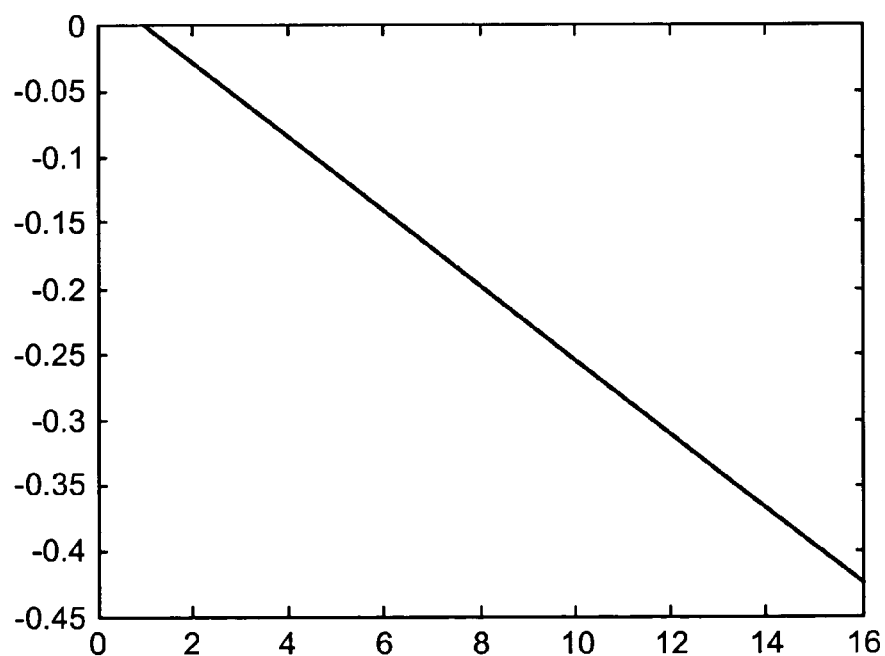
Figure 9K:
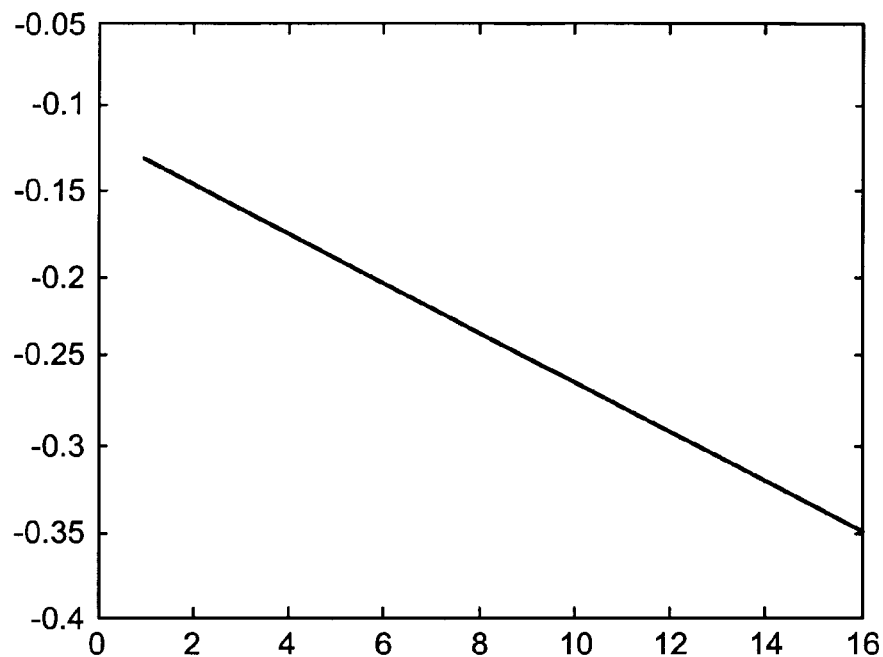
Figure 9L:
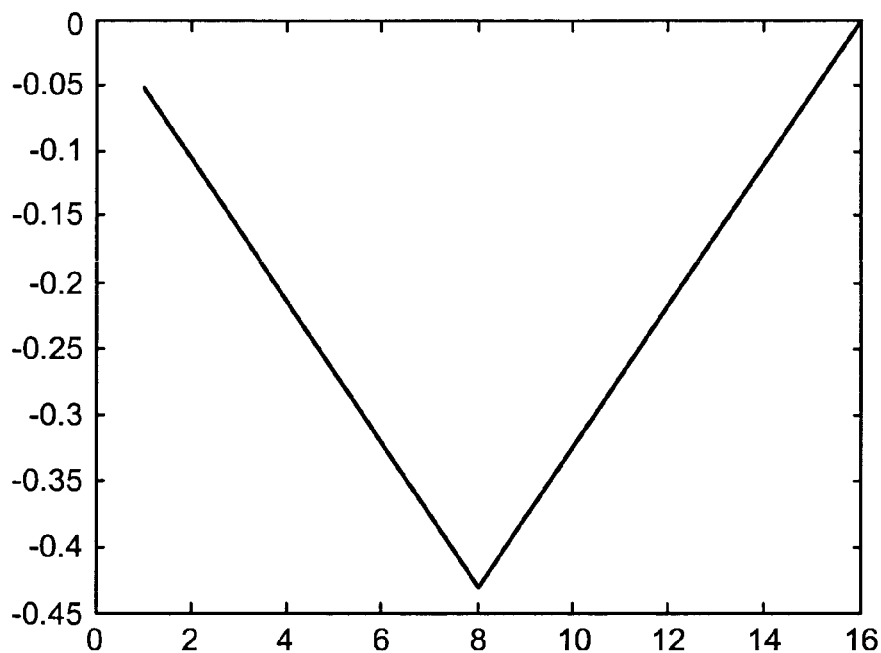
Figure 9M:
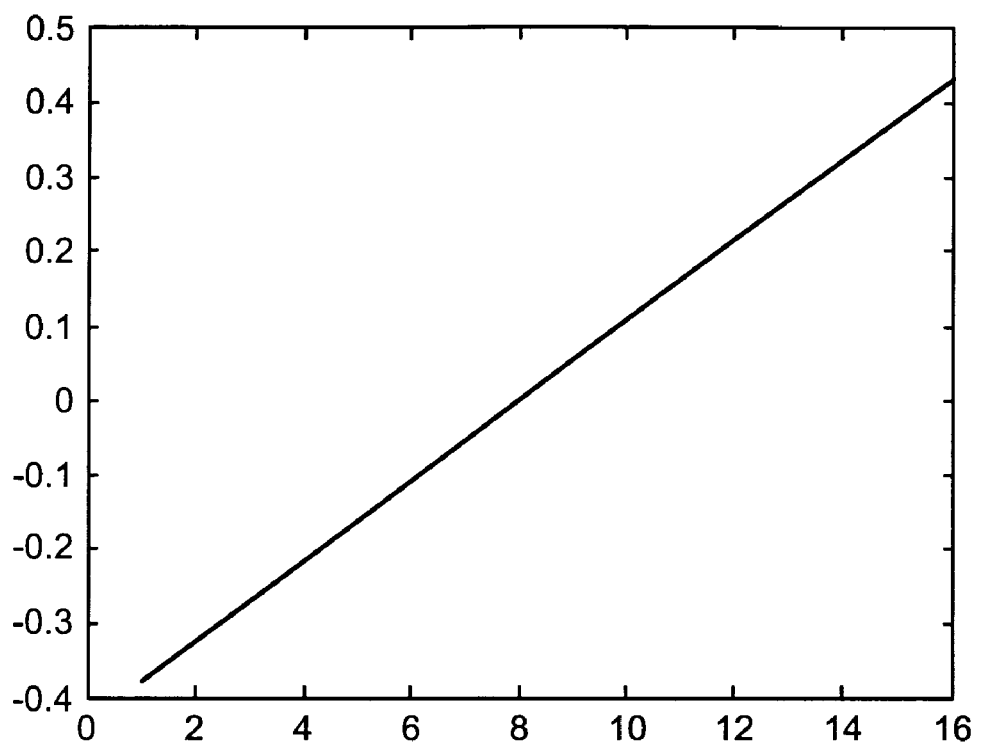

A more detailed description of an example prediction process will now be provided with reference to FIG. 8, which is an illustrative flowchart showing an example prediction process in accordance with an example embodiment. In step S802, rules are created to monitor KPIs of interest. Typically, rules are created against a small set of KPIs using the current state(s) of knowledge of the user and/or the system itself.

As noted above, a rule may identify a significant condition under which a process or resource becomes problematic or requires attention. A rule may be applied to a process or to a type of data. Each rule may include a logical expression. For example, simple expressions may be created to test a single condition, or a complex expression may be created to test two or more conditions. The expression may then be evaluated to determine if it is true or false. When the expression evaluates to true, an appropriate alert (e.g., email message, text message, and/or the like) may be sent to a defined user. Thus, in certain example embodiments, a rule may include a name and a set of attributes to be associated with the rule, one or more expressions to comprise the rule that include and/or operate on the attributes, and a proposed action that should be taken (if any) when the rule evaluates to true.

In step S804, prediction templates are created to identify rules on which predictions are to be made. As described above, the prediction templates include relevant timeframe and accuracy threshold information. For example, the prediction templates indicate a past interval, specifying how far into the past data should be analyzed when making predictions, and also indicate a future interval, specifying how far into the future predictions should be made. The accuracy threshold is a user-defined variable indicative of the level of certainty that a problem will occur necessary before raising an alert.

A polling process, e.g., of the type described above, is entered into in step S806 to collect data regarding the KPIs. As such, the prediction engine is connected to stream of data and has knowledge of potential errors.

In step S808, it is determined whether each KPI should be added to a Naïve Bayesian Network (NBN) for prediction analysis. As will be described in greater detail below, the NBN marks rules for prediction and root cause analysis, and the NBN determines if other monitors apart from those identified in the prediction template are causes of, or correlated with, the rule violation. This determination may be based on a gardening algorithm or process. An example gardening algorithm or process may involve, for example, collecting mean and standard deviation information for the KPI data elements that are assumed to be potentially relevant to an adverse event. Thus, an example gardening algorithm or process may look at the values of different KPI data elements streaming in, and then calculate the mean and standard deviation for the KPI data elements at every collection interval, e.g., to determine how far an individual KPI data element deviates from the mean (e.g., using a Z-factor analysis, as described above). KPI data may not be added to the NBN if the variance for a particular time period is below a predefined threshold. Also, data may be pruned starting from a point where there is no deviation from the mean and then moving outwards. For example, data within about 2 standard deviations of the mean may be weeded out. The collection interval may be user-defined and/or standardized. For example, memory utilization may be collected at one minute time intervals. By contrast, for example, a business process may be monitored at a user-defined interval and may be monitored for liveliness rather than absolute utilization or absolute failure, e.g., it may be advantageous to determine whether there are more problems handling or longer lag times in a business process. In certain example embodiments, it is advantageous to include user-defined collection intervals, as users often know more information about or have a better intuition for their own businesses.

Thus, a KPI is added into NBN based on statistics associated therewith, which may be gathered over time and with each KPI having its own defined collection interval. In certain example embodiments, a predefined amount of information may be captured to form baseline information. For example, data may be collected for at least 24 hours before forming a baseline in certain example embodiments, and in certain example embodiments each time timeslot (e.g., for time of day, day or week, etc.) also may have its own set of statistics associated therewith. In general, when forming baseline data, the amount of data to be collected should be sufficient to allow the standard error to be sufficiently low so as to reduce the amount of uncertainty associated with the statistics.

The gardening algorithm or process may produce a set of data elements to be processed by the NBN. If a KPI data element is determined to be potentially relevant (e.g., greater than or equal to about two standard deviations from the mean), referring once again to FIG. 8, a time-series transform is applied to the KPI data and the transformed data is mapped to one of several predefined waveforms in step S810. The time-series transform helps reduce the problem of different KPI values coming in at different time intervals, e.g., by creating a time-standardized discrete data set for the KPI. In certain example embodiments, the time-series transform is a Fast Fourier Transform (FFT). It will be appreciated that the FFT allows a correlation to be performed quickly, which therefore allows the incoming data stream to be compressed. A wavelet transform could also serve this purpose in a different way, as it can transform to a domain where the data are sparse. Other transforms are also possible.

Example waveforms are shown in FIGS. 9a-m. It will be appreciated that other waveforms may be used in place of, or in connection with, those shown in FIGS. 9a-m. The matching of the transformed KPI data to one of the waveforms may be processed in a manner similar to vector quantization in certain example embodiments. It is not necessary that the transformed KPI data match a waveform perfectly; rather, a "closest" match may be sufficient for certain example embodiments. It will be appreciated that the application of a time-series transform and the matching to a waveform may advantageously help to reduce the amount of data to be processed and/or fed into the NBN. Also, it will be appreciated that the transforms are applied before adding KPI data to NBN, therefore advantageously reducing the complexities associated with potentially disparate collection intervals, different amounts of data, etc.

If the KPI data to be added to the NBN does not already have an entry in the data structure corresponding to the NBN, an entry may be created. This may occur, for example, if the KPI was not included in a rule and has not yet been out of its "normal" range. If there is an entry in the NBN for the potentially relevant KPI data, the entry may merely be updated. Thus, because there is no a priori indication of how large the NBN has to be, the NBN is dynamically constructed as the process executes and, for example, as new KPIs are flagged.

The NBN may be updated with such data and the probabilities in the NBN may be updated or re-updated, as appropriate. Thus, this second classification step corresponds to a classification as to whether there will or will not be a rule violation over the next time period.

The NBN refines the prediction templates provided by the user and/or system. For example, in certain example embodiments, the NBN may help to prioritize the importance of KPIs, collects critical ranges of KPIs, etc. The NBN is also advantageous in that in certain example embodiments it may look at a wide range of time-slices, at least some of which are before the adverse condition, to try to find a "yellow light" before a rule violation occurs.

In general, a conventional Bayesian Network (or a conventional Bayesian Belief Network) is a probabilistic model that represents a set of variables and their probabilistic independencies. The term "Bayesian Network" emphasizes (1) the oftentimes subjective nature of the input information, (2) the reliance on Bayes' conditioning as the basis for updating information, and (3) the distinction between causal and evidential modes of reasoning. Formally, conventional Bayesian Networks are directed acyclic graphs whose nodes represent variables, and whose arcs encode conditional independencies between the variables. Nodes can represent any kind of variable, including measured parameters, latent variables, or hypotheses. Conventional Bayesian Networks, in general, are not restricted to representing random variables, which represents another "Bayesian" aspect of a conventional Bayesian Network.

Because a conventional Bayesian Network is a complete model for the variables and their relationships, it can be used to answer probabilistic queries about them. For example, the conventional Bayesian Network can be used to derive updated knowledge of the state of a subset of variables when other variables (the evidence variables) are observed. The process of computing the posterior distribution of variables given evidence is probabilistic inference. The posterior distribution gives a universal sufficient statistic for detection applications, when attempting to choose values for the variable subset to reduce some expected loss function, e.g., the probability of decision error. A conventional Bayesian Network can thus be considered a mechanism for automatically applying Bayes' theorem to complex problems.

As opposed to standard or conventional Bayesian networks, the NBN of certain example embodiments includes strong independence assumptions. For example, in certain example embodiments, the NBN assumes that the individual probabilities of all KPIs are independent. Advantageously, this modeling technique has been determined to closely resemble reality over time. This modeling technique also advantageously results in high efficiency in terms of both speed and use of resources, while also allowing for the dynamic consideration of attributes or KPIs streaming in to the NBN. Furthermore, the NBN advantageously can be made to process BAM-related data, including KPI data. This processing may occur substantially in real-time and also may take into account multiple variables across multiple timeframes.

Figure 10:
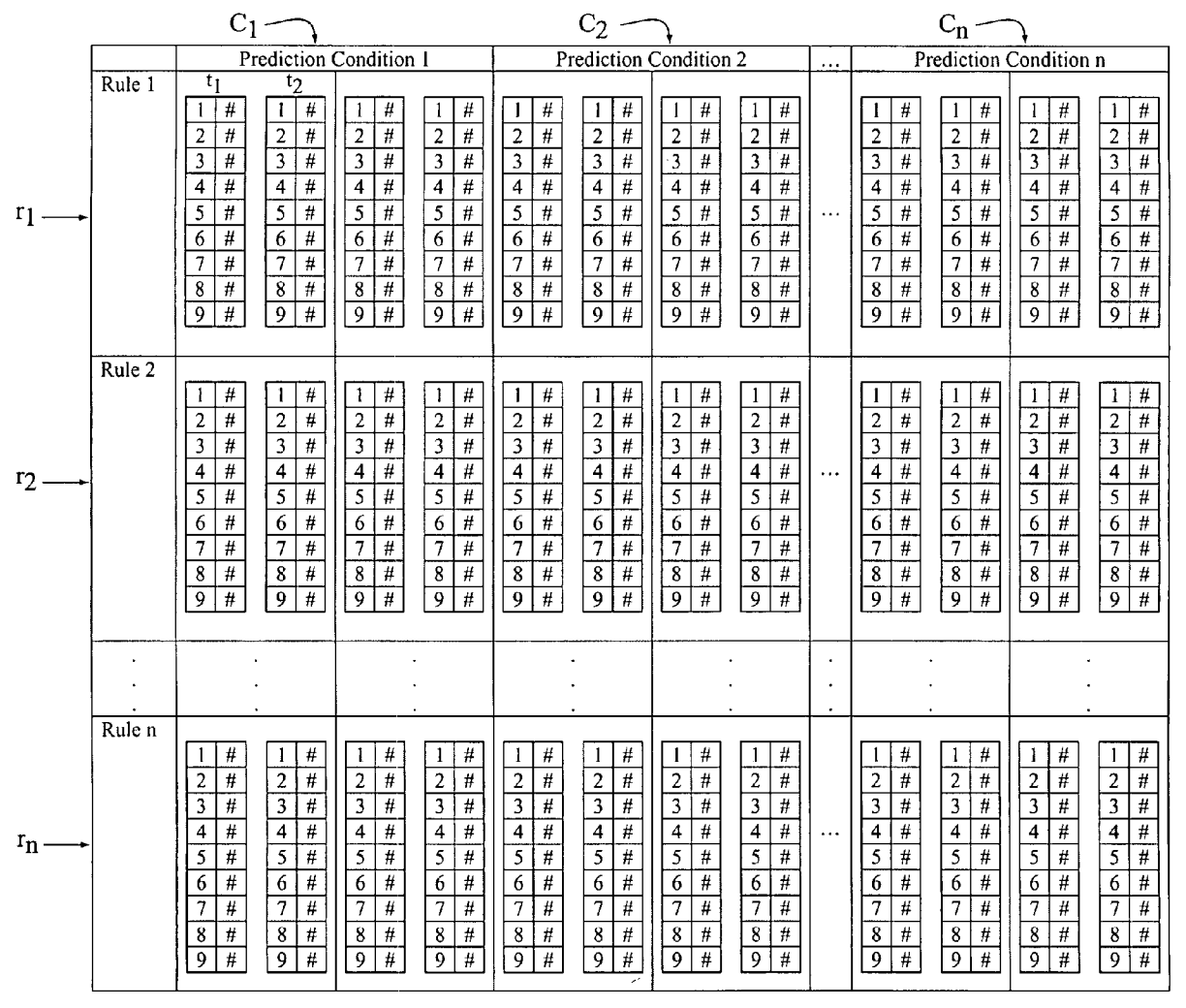

FIG. 10 is an illustrative data structure for a Naïve Bayesian Network in accordance with certain example embodiments. As shown in FIG. 10, the NBN may be a multi-dimensional table. The major rows $r_1, r_2, \ldots, r_n$, correspond to rules and the major columns $c_1, c_2, \ldots, c_n$, correspond to KPI values (e.g., prediction conditions). Within each major row and major column are two tables, a first table $t_1$ for tallying when the KPI associated with the column does not trigger the rule, and the second table $t_2$ for tallying when the KPI associated with the column does trigger the rule. Within the first and second tables, a count is stored for each of the corresponding waveforms that the KPI data might match. Thus, when a KPI is of interest (e.g., within 2 or more standard deviations from the mean or flagged for interest in the rule), the applicable rule and the prediction condition are found, and the count corresponding to the waveform that matches the transformed data is updated in the first or second table in dependence on whether the KPI is out-of-bounds. Of course, it will be appreciated that other data structures may be used to represent the NBN.

Thus, it will be appreciated that this and/or other data structures may enable the NBN to be created and/or updated dynamically. For example, the rules, prediction conditions, number of KPIs, number of waveforms, and/or the like, all may be advantageously dynamically created and/or updated. This provides flexibility of analysis and reduces computational resource requirements, e.g., by allowing for dynamic and/or potentially sparse data structures to be implemented in certain example embodiments.

Referring once again to FIG. 8, in step S812, relevance values in the prediction template are updated, e.g., for root cause analysis. This process may involve an examination of the probability distributions for the KPIs. More particularly, for each KPI associated with a prediction template, a chi-square analysis may cross-tabulate the KPIs when rule violations occur and when rule violations do not occur. If the chi-square analysis reveals that there is a significant difference (e.g., a probability or p-value less than or equal to 0.10) between the two sets of KPIs, root cause information may be updated, as it is therefore likely that the particular KPIs are correlated with, or possibly even cause, the rule violation.

Optionally, this type of relevance-type analysis (e.g., based on a chi-square analysis) may be used to garden KPI data in connection with or apart from the Z-factor analysis.

Once an event of interest has been predicted to within a predefined threshold, an appropriate alert may be raised (e.g., by an alert module) and/or action(s) may be taken automatically (e.g., without direct user intervention by, for example, suitably configured programmed logic circuitry) or as prompted for by certain example embodiments. An alert may include, for example, an email message (e.g., sent via an email server), a text message (e.g., sent via an SMS or other suitable gateway), a window-based alert or notification window provided to a terminal or other computer, etc.

It will be appreciated that although certain example embodiments disclosed herein have been described in relation to monitoring and predicting "bad" events, the present invention is not so limited. Rather, the techniques of certain example embodiments may be applied to any event of interest. For example, certain example implementations may track "good" events such as, for example, revenue beyond expected values, efficiency above a threshold value, etc.

It also will be appreciated that the techniques of certain example embodiments are not limited to BAM-related data. Rather, the prediction techniques of certain example embodiments, for example, may be applied to any data from any source. Also, it will be appreciated that the example embodiments herein may be implemented as any suitable combination of programmed logic circuitry including, for example, hardware, software, firmware, and/or the like. Additionally, certain example embodiments and/or aspects thereof may be tangibly stored as instructions on a computer-readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of analyzing data in a business processing management environment, the method comprising:
   identifying a plurality of performance indicators, each said performance indicator being related to a process and/or system component;
   defining at least one rule to monitor at least one said performance indicator of a process and/or system component;
   creating a prediction template to identify at least one rule on which to create a prediction, the prediction template including a past interval indicative of an amount of data to be analyzed before making the prediction, a future interval indicative of how far into the future the prediction is to be made, and an accuracy threshold indicative of a probability level to be reached in making the prediction;
   gathering data for each said performance indicator over a plurality of collection intervals;
   gardening the gathered data to discard gathered data within a normal operating range for a given collection interval;
   applying a time-series transform to the gardened data to normalize any variations in collection intervals;
   feeding the transformed gardened data into a dynamically updatable Naïve Bayesian Network (NBN) such that an entry is created for the transformed gardened data when the NBN does not include an entry for the transformed gardened data, and such that an already existing entry for the transformed gardened data is updated when the NBN includes an entry corresponding to the transformed gardened data;
   making the prediction and determining an accuracy thereof using probabilities computed by the NBN; and
   updating a relevance value associated with each performance indicator in a rule using the gardened data for root cause analysis,
   wherein the gathering and the making of the prediction are performed substantially in real-time.

2. The method of claim 1, further comprising calculating a mean and standard deviation for each performance indicator over each collection interval,
   wherein the gardening of the gathered data is performed in dependence on a comparison between the performance indicator and the mean and standard deviation thereof.

3. The method of claim 2, wherein the gathered data is not discarded when it is at least two standard deviations from the mean.

4. The method of claim 1, further comprising matching the transformed gardened data to one of a plurality of predefined waveforms; and
   replacing the transformed gardened data with the matching waveform.

5. The method of claim 1, wherein the time-series transform is a Fast Fourier Transform.

6. The method of claim 1, further comprising updating the relevance value associated with each performance indicator based on a chi-square analysis of performance indicators associated with the rule and performance indicators not associated with the rule.

7. The method of claim 1, further comprising gardening based on a chi-square relevance analysis.

8. The method of claim 1, further comprising when a prediction is made and the accuracy thereof is at least equal to the accuracy threshold of the prediction template, raising an alert.

9. The method of claim 8, further comprising generating at least one of an email message, an SMS message, and a notification window on a terminal when an alert is raised.

10. The method of claim 1, further comprising adjusting system resources and/or business processing in dependence on the prediction.

11. A system of analyzing data in a business processing management environment, comprising:
    a performance indicator storage location for storing a plurality of performance indicators, each said performance indicator being related to a process and/or system component;
    a rules storage location including at least one rule for monitoring at least one said performance indicator of a process and/or system component;
    a prediction templates storage location including at least one prediction template for identifying at least one rule on which to create a prediction, each said prediction template including a past interval indicative of an amount of data to be analyzed before making the associated prediction, a future interval indicative of how far into the future the associated prediction is to be made, and an accuracy threshold indicative of a probability level to be reached in making the associated prediction;
    a connection to a data stream, the data stream including data for each said performance indicator over a plurality of collection intervals;
    a gardening module configured to garden the data in the data stream to discard data within a normal operating range for a given collection interval;
    a time-series transformation engine configured to apply a time-series transform to the gardened data to normalize any variations in collection intervals;
    a dynamically updatable Naïve Bayesian Network (NBN) configured to receive the transformed gardened data such that an entry is created for the transformed gardened data when the NBN does not include an entry for the transformed gardened data, and such that an already existing entry for the transformed gardened data is updated when the NBN includes an entry corresponding to the transformed gardened data; and a prediction engine configured to make the prediction and to determine an accuracy thereof using probabilities computed by the NBN, and further configured to update a relevance value associated with each performance indicator in a rule using the gardened data for root cause analysis, wherein the gardening module and the prediction engine operate substantially in real-time.

12. The system of claim 11, wherein the gardening module is further configured to calculate a mean and standard deviation for each performance indicator over each collection interval, and wherein the gardening of the gathered data is performed in dependence on a comparison between the performance indicator and the mean and standard deviation thereof.

13. The system of claim 12, wherein the gathered data is not discarded when it is at least two standard deviations from the mean.

14. The system of claim 11, further comprising a plurality of predefined waveforms, the transformed gardened data being matched to one of said waveform prior to its inclusion in the NBN.

15. The system of claim 11, wherein the time-series transform is a Fast Fourier Transform.

16. The system of claim 1, wherein the relevance value associated with each performance indicator is updated based on a chi-square analysis of performance indicators associated with the rule and performance indicators not associated with the rule.

17. The system of claim 11, wherein the gardening module is configured to garden data based on a chi-square relevance analysis.

18. The system of claim 11, further comprising an alert module activatable when a prediction is made and the accuracy thereof is at least equal to the accuracy threshold of the prediction template.

19. The system of claim 18, wherein the alert module is configured to generate at least one of an email message, an SMS message, and a notification window on a terminal.

20. The system of claim 11, further comprising programmed logic circuitry for adjusting system resources and/or business processing in dependence on the prediction.

* * * * *